United States Patent [19]

Puls

[11] 4,409,629
[45] Oct. 11, 1983

[54] MECHANISM FOR CENTERING AND CLAMPING A FLOPPY DISC

[75] Inventor: Norman M. Puls, Woodland Hills, Calif.

[73] Assignee: Magnum Division of Tandon Corporation, Chatsworth, Calif.

[21] Appl. No.: 259,913

[22] Filed: May 4, 1981

[51] Int. Cl.³ .................. G11B 5/016; G11B 17/02; G11B 25/04
[52] U.S. Cl. .................................. 360/99; 360/97
[58] Field of Search .................. 360/99, 97, 133, 135

[56] References Cited

U.S. PATENT DOCUMENTS

| | | | |
|---|---|---|---|
| 3,940,793 | 2/1976 | Bleiman | 360/99 |
| 4,040,106 | 8/1977 | Medley | 360/99 |
| 4,125,883 | 11/1978 | Rolph | 360/99 |
| 4,171,531 | 10/1979 | Grapes et al. | 360/97 |
| 4,177,491 | 12/1979 | Jann | 360/99 |
| 4,216,510 | 8/1980 | Manzke et al. | 360/99 |

FOREIGN PATENT DOCUMENTS 2081487 2/1982 United Kingdom ............. 360/133

OTHER PUBLICATIONS

IBM TDB, J. J. Holecek et al., Loading Collet for Flexible Magnetic Disks, vol. 21, No. 1, Jun. 1978, pp. 291-292.

Primary Examiner—Alfred H. Eddleman
Attorney, Agent, or Firm—Fraser and Bogucki

[57] ABSTRACT

A positioning and clamping system for floppy disc recording media utilizes a tapered positioner cone having extremely pliant petals. The cone defines a nominal circumference which is greater than the disc aperture, and the petals yield to conform to disc placement. Centering is accomplished before clamping by a radial return of the petals to balanced positions, acting against the unclamped disc. The geometry of the cone and follower are such that forces that would tend to distort the cone are minimized.

10 Claims, 8 Drawing Figures

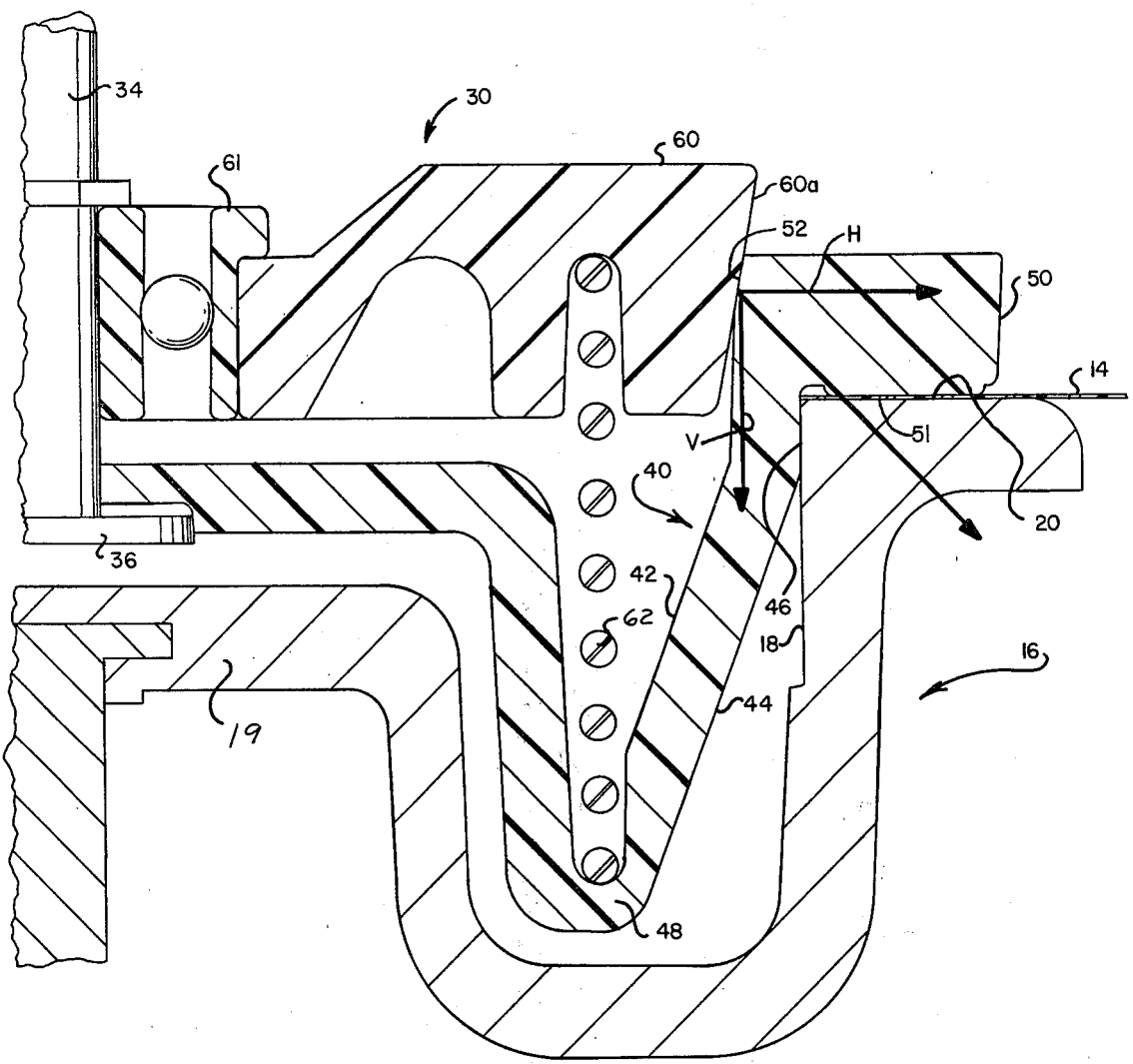
FIG.7
FIG.8
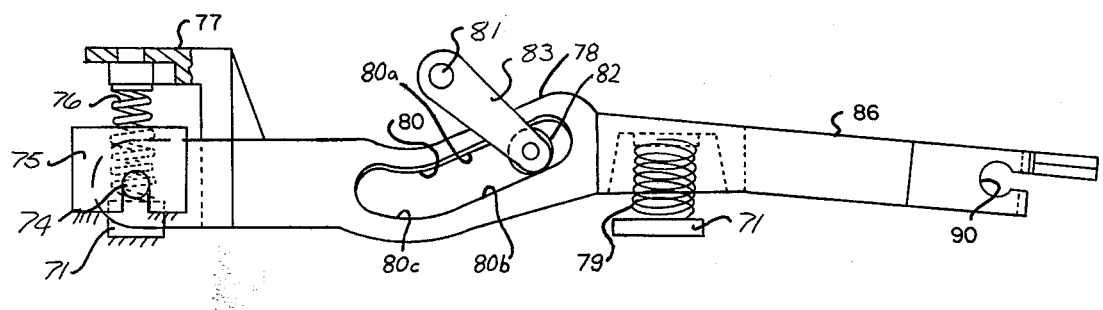

MECHANISM FOR CENTERING AND CLAMPING A FLOPPY DISC

BACKGROUND OF THE INVENTION

In systems using flexible media, specifically the so-called "floppy disc" systems, the media is confined within an envelope so that it can be stored, handled, mailed, and conveniently inserted into and removed from the floppy disc drive. The envelope has openings for different purposes, including a central opening exposing the central aperture of the compliant magnetic disc. The floppy disc drives are configured so that, when the disc is inserted into operative position, a member on one side of it can engage the central part of the disc against a rotatable spindle on the other, clamping the disc between the members and thus rotating the disc with the spindle, so that recording and reproduction can be accomplished.

In the earliest forms of floppy disc drives, as evidenced by Dalziel U.S. Pat. No. 3,678,481, the clamp and drive arrangement used a solid conical element to fit within the central aperture of the floppy disc. The conical element penetrated within a central concavity in the spindle, centering the disc concurrently with clamping, by moving the conical member into an engaged position. This arrangement was generally satisfactory for initial systems, in which relatively wide tracks (e.g. 12 mils) at relatively low track density (e.g. 48 tracks per inch) were utilized. It was, however, discovered that the edges of the media adjacent the central aperture could be bent, buckled and worn by this arrangement. Furthermore, variations in the central aperture dimension could cause substantial variations in the position of the disc relative to the central axis, materially reducing the reliability of the systems, particularly because floppy discs are used in interchangeable fashion.

There has thus been considerable attention directed toward improving the positioning and clamping structures for floppy disc mechanisms, as evidenced by U.S. Pat. Nos. 4,125,883 to Rolph, 4,208,682 to Bryer and 4,171,531 to Grapes et al, and the patents cited therein. As the art has evolved, the positioner cone, generally a plastic element, has been segmented radially into a number of petals or leaves, which are arranged to be somewhat resilient but substantially stiffer than the deformation characteristics of the floppy disc. There is a wide range of different approaches to the problem, as evidenced by the various patents, because the problems are not simple and require a number of compromises. The problems become more complex as the track widths become smaller (e.g. 4 to 6 mils) and the track density is doubled (e.g. 96 to 100 tpi). Under these conditions, expectable variations in the diametral size of the central aperture of the floppy disc, edge deformation on the floppy disc, and variations in the positioner cone itself, tend to introduce eccentricity of the floppy disc about the central axis.

Prior art systems, while they take a great variety of forms, are usually based upon the thoughts that the leaves making up the positioner cone must be stiffer than the floppy disc, and that centering is to be effected concurrently with clamping. For these purposes, the outer dimension of the positioner cone in the region of full clamping engagement is supposed to match precisely the interior aperture of the floppy disc. This approach has not proven to be satisfactory in practice in meeting the requirements imposed by small track width, high track density systems. One major problem is that each of the parts used must be made very precisely, to tolerances that mean that production yields are very low. Devices in accordance with patents such as U.S. Pat. No. 4,125,883, which discusses centering before clamping, encounter substantial problems in practice because they depend too much upon the precise shape of the positioner cone, which shape cannot reliably be maintained because aging, thermal distortion and wear affect the dimensions and shape of the plastic elements.

The state of the art is evidenced by a structure disclosed in U.S. Pat. No. 4,139,876 to Owens in which the positioner cone is retained in a pivotable frame that can be moved downwardly to engage the positioner cone against a spindle. The positioner cone is somewhat non-compliant and its outline is smaller than the disc aperture. The cone, in practice, is segmented into separate stiff petals. As the cone is seated on the spindle, a follower acts to spread the cone, attempting to center the floppy disc concurrently with the clamping. Such a system buffers both from problems of disc alignment and imprecise centering.

SUMMARY OF THE INVENTION

In direct opposition to the teaching of the prior art, a positioner cone that is segmented into many light, readily deformable petals is provided, with the petals being deliberately oversize relative to the central opening in the floppy discs. The petals are also so compliant that they, rather than the floppy disc, are displaceable upon contact with the disc edge during insertion. Each petal of the positioner cone has a tapered major outer surface diverging from the small insertion end and leading to a short upper reference surface forming a part of a cylinder. When the cone is inserted the small end of the cone initially penetrates into the plane of the disc through the central disc aperture. With further insertion, the petals being to contact the edge of an off-center disc and are bent inwardly, but then respond by urging the unconfined disc to a concentric position as the insertion movement continues and the forces on the petals come into balance. The cylindrical portion of the cone then enters the spindle concavity with the floppy disc already centered. At the limit of travel, a truncated conical follower on the positioner mechanism overcomes a spring bias and engages the petals, urging them downwardly and outwardly. The underside of outwardly directed circumferential flanges on the petals are forced against an annular upper rim of the spindle, while the cylindrical portion is forced against the side wall of the spindle, clamping the disc firmly and enabling the drive to operate. The follower, cone, disc and spindle are firmly united to rotate as one unit.

Further in accordance with the invention, the positioner cone is made of a high friction but very compliant plastic material, with the cylindrical reference surface defined by the multiple petals being 0.001" to 0.003" (0.025 mm to 0.076 mm) oversize relative to the floppy disc central aperture. The petals are substantially larger in number than heretofore used (16 versus 4 to 8) and have a very thin web portion defining a defnite bending region at the approximate bottom of the cone. Thus the petals are highly compliant but nonetheless structurally and operatively reliable. A beveled inner edge at the upper part of the cone provides an engagement surface for the follower cone. This engagement surface is located in such a position that vertical and horizontal force vectors do not distort the cone so as to interfere either with alignment, firm engagement, or clamping action.

DETAILED DESCRIPTION OF THE DRAWINGS

A better understanding of the invention may be had by reference to the following description, taken in conjunction with the accompanying drawings, in which:

FIG. 7 is a side sectional view of the positioner cone assembly of FIG. 1, showing the operative relation thereto of a floppy disc; and FIG. 8 is a side view of a portion of the yoke loading mechanism of FIG. 1.

DETAILED DESCRIPTION OF THE INVENTION

Figure 1:
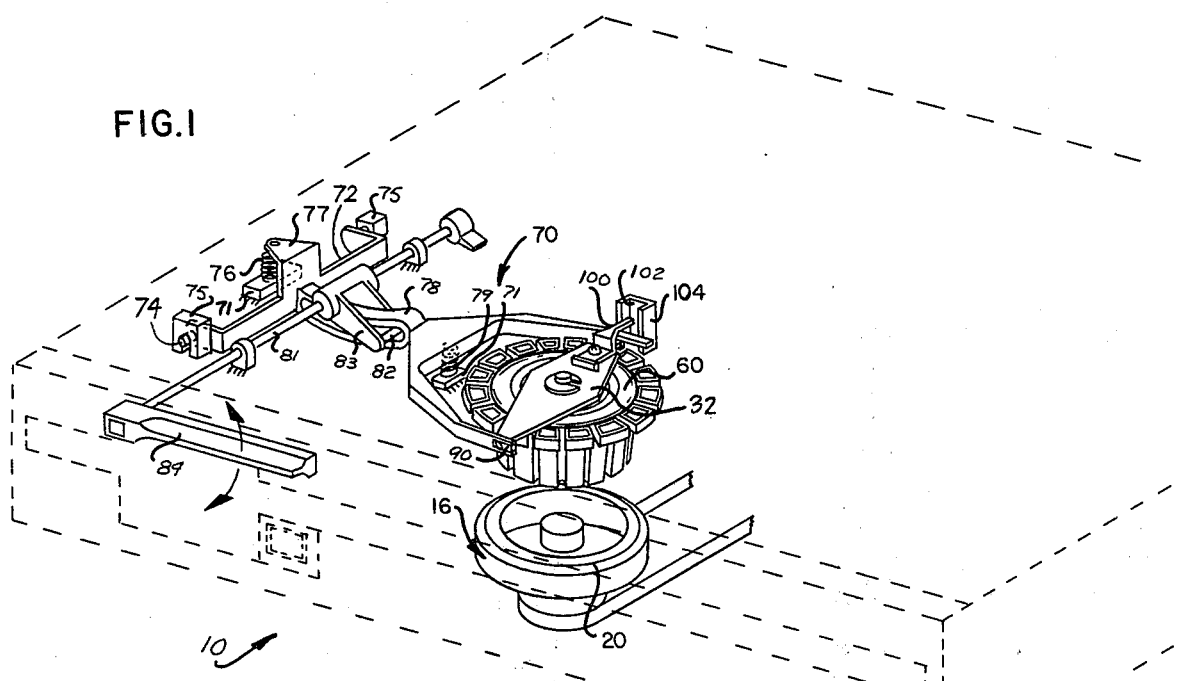
FIG. 1 is a simplified perspective view, partially broken away and partially in phantom, of a system assembly in accordance with the invention utilizing a positioner cone assembly and a yoke loading mechanism.

A floppy disc drive 10 in accordance with the invention, referring now to the drawings, is shown in which an envelope 12 (FIG. 6) containing a floppy disc 14 may be inserted via an entry slot into an approximately concentric operating position relative to the central axis of a center spindle 16. The center spindle 16, driven by a pulley 17 (FIG. 6), has a cup-shaped interior concavity 18, bounded by an upper annular rim surface 20 that defines the reference plane for the floppy disc and the engagement surface for rotating the floppy disc 14. A central, hollow boss 9 within the concavity is adapted to receive a bearing (not shown) to support the spindle thereby permitting the unit to have a low profile and compact configuration. Conventional means, such as a motor and a belt drive coupled to the shaft of the center spindle 16, are utilized to rotate the spindle and need not be described in detail. As is well known, and shown only generally in FIG. 6, the envelope 12 includes a central aperture 22 that is larger than the central aperture 24 of the floppy disc 14. Thus, a band of material about the central aperture 24 of the floppy disc is exposed to be engageable against the upper annular rim 20 of the center spindle 16.

In the present specification and claims, it is assumed for purposes of description and reference that the floppy disc will be mounted in the position shown, so that such reference terms such as "upper", "vertical" and "horizontal" will be utilized for convenience. It should be well recognized, however, that floppy disc drives are often mounted in other attitudes, as with the disc held in a vertical plane, and that the terms are to be taken in the sense in which the parts relate to each other.

A positioner cone mechanism 30 comprises a transverse support beam 32 from which depends a shaft 34 centered on the central axis and including an end flange or limit stop 36 at the end that is closest to the center spindle 16. A positioner cone 40 is mounted on the shaft 34, normally being in engagement with the limit stop 36. The positioner cone 40 includes multiple petals or leaves 42 extending from an integral cup-shaped and inverted body. There are sixteen petals in this example, and the cone 40 is made of a durable yet compliant plastic, such as "Norel", sold by the General Electric Company. This is a high friction but non-brittle material that can be molded precisely to shape. The petals 42 together define an exterior outline of precisely defined geometry. From the lowermost region of the cone 40 at the bottom of the cup-shaped body each petal 42 curves back upwardly to provide a diverging major surface 44 lying along the surface of a divering cone. The bottom ring of the cone 40 defined by the petals 42 nests within the concavity 18 of the center spindle 16, about the boss 19, contributing to the low profile design. The diverging surface 44 merges at its upper region into an integral minor surface 46 forming a partial arc of a complete cylinder concentric with the central axis. The cone diameter at the minor surface 46 region is substantially greater than the nominal inner diameter of the central aperture 24 of the floppy disc 14. In this example the cylinder defined by the minor surfaces 46 is approximately 0.002" (0.051 mm) greater in diameter than the floppy disc central aperture 24. A range of 0.001" to 0.003" (0.025 mm to 0.076 mm) may be used for floppy discs of conventional types with this construction. The specifications for floppy discs provide a central aperture diameter of 1.500" (38.1 mm) with a small plus and minus tolerance, and for this combination the spindle is given a 1.5000" (38.1 mm) inside wall diameter with only a minus tolerance permitted.

The bottom of each petal 42 is joined to the inverted central cup, as but seen in the sectional view of FIG. 7, by a thin web section 48 to provide controlled compliance in movement of each petal 42 inwardly or outwardly relative to the central axis. The forces needed to deflect an individual petal 42 at its minor surface 46 are sufficiently low that the petals 42 deform upon initial contact of the tapered minor surface 46 with a disc edge rather than bending or buckling the floppy disc 14 itself.

At the upper end of each petal 42 is an outwardly protruding flange 50 having an undersurface 51 for bearing against the upper annular rim 20 of the center spindle 16. A right angle is thus formed by the cylindrical minor surface segment 46 and the adjoining undersurface 51 of the flange 50. The inside upper surface of each petal 42 also includes a bevel surface 52 which defines an arc portion of a conical surface when in nominal position.

A follower 60 in the form of a truncated cone having an outer surface 60a that converges in the direction toward the positioner cone 30 is also mounted on the rotatable shaft 34, above the positioner cone 40. A helical spring 62 about the shaft 34, between the lower surface of the follower 60 and the upper inside surface of the positioner cone 40 above the webs 48, biases the positioner cone 40 away from the follower 60, against the lower limit stop 36. This spring 62 has a greater spring force than that needed to deflect the petals 42. The follower 60 is coupled to the shaft 34 by a bearing 61 and is held against upward movement on the shaft 34 by a retainer ring fitting within a circumferential groove in the shaft. The angle of convergence of the surface 60a the follower cone 60 matches the conical surface defined by the bevels 52 on the upper inner rim of the petals 42 of the positioner cone 40.

The positioner cone mechanism 30 is supported in a pivotable yoke mechanism 70 mounted on a part of the disc drive frame 71 and having a pair of base arms 72 pivotting about outwardly extending pivot pins 74, as best seen in FIGS. 1, 2, 6 and 8. The pivot pins 74 seat (in low friction bushings not shown in detail) within seats 75 forming part of the frame and open on the underside thereof to permit some movement, as described below. As relatively heavy spring 76 in the plane of the pivot pins 74 is coupled between the frame 71 and the underside of an offset tab 77 coupled to the base arms 72. From the base arms 72 a slightly curved central member 78 on the yoke mechanism 70 extends along an axis substantially but not precisely parallel to the nominal plane of the floppy disc. The central member 78 has two spaced apart segments defining a guide slot 80 (best seen in FIG. 8) having side-accessible, curved guiding surfaces 80a and 80b for a control pin 82 that extends transversely through the slot 80 in the member 78. A rotatable shaft 81 held in bearings (not shown in detail) mounted on the frame 71 transversely to the central member 78 supports a crank arm 83 coupled to the control pin 82. Shifting a control lever 84 (FIG. 1) on the front panel rotates the control pin 82 backward or forward on the crank arm 83 between limit positions relative to the guide slot 80. A relatively light spring 79 between the underside of the central member 78 and the frame 71 urges the yoke mechanism 70 away from the spindle 16. The guide slot 80 is curved to provide an overtravel or toggle-type action because it defines both a lifting arc and a locking arc, as is described hereafter The control pin 82 is rotated to its forward position by rotating the shaft 81 using the control lever 84. In this position it is spaced closer to the central axis of the floppy disc and the yoke mechanism 70 is pivoted away from the floppy disc 14. When the control pin 82 is moved toward its backward position along the surface 80b within the guide slot 80, the yoke mechanism 70 is pivoted downwardly against the force of the light spring 79. At the point 80c at which the guide slot 80 curvature changes angle, the positioner cone mechanism 30 has been moved into contact with the floppy disc 40 and the center spindle 16. This is the point at which an overtravel and toggle-type action is initiated. The light spring 79 is fully compressed when the overtravel movement begins as the crank arm 83 rotates the control pin 82 toward the pivot axis. As this occurs, the ramp angle changes, providing greater leverage from the force exerted on the control lever 84 (FIG. 1). Because the central member 78 is fully compressing the light spring 79, further movement of the member 78 requires some compression of the heavy spring 76 at the pivot end. The offset tab 77 extending from the base arms acts downwardly against the heavy spring 76, at the same time moving the pivot pin 74 slightly downward from the pin seats 75. Consequently, the yoke mechanism 70 exerts a spring-responsive torque about the control pin 82 on the clamping mechanism. With the typical lever arms and moments for a system as shown in the drawings a clamping force of about ten (10) pounds can be exerted without strain in actuating the control lever 84. The overtravel movement also ensures that the control lever 84 is stable in the loaded (disc operative) position. The force exerted by the heavy spring 76 can be adjusted by using a conventional tightening nut or other member (not shown in detail). Motion is controlled both by the springs 76 and 79 and the shape of the guide slot 80, so that the actions of centering and clamping are effected in one smooth continuous sequence.

The yoke mechanism 70 also controls the path of movement of the cone mechanism 30. Adjacent the free ends of a first arm 86 and a second arm 88 of the yoke mechanism 70, transverse apertures 90, 92 are provided that receive the end pins 92, 94 of the support beam 32 for the positioner cone assembly 30 and provide pivot bearing surfaces at the opposite ends. These pivot points, at 93 and 94, effectively gimbal-mount the positioner cone assembly 30 along a gimbal axis parallel to the plane of the inserted floppy disc. A groove follower tab 100 is mounted on one end of the support beam 32, to ride within a vertical guide groove 102 in an adjacent guide member 104. The follower tab 100 controls, together with the pivot points on the ends of the support beam 32, the attitude of the positioner cone mechanism 30 as it is moved upwardly and downwardly on the end of the pivotable yoke mechanism 70.

Figure 2:
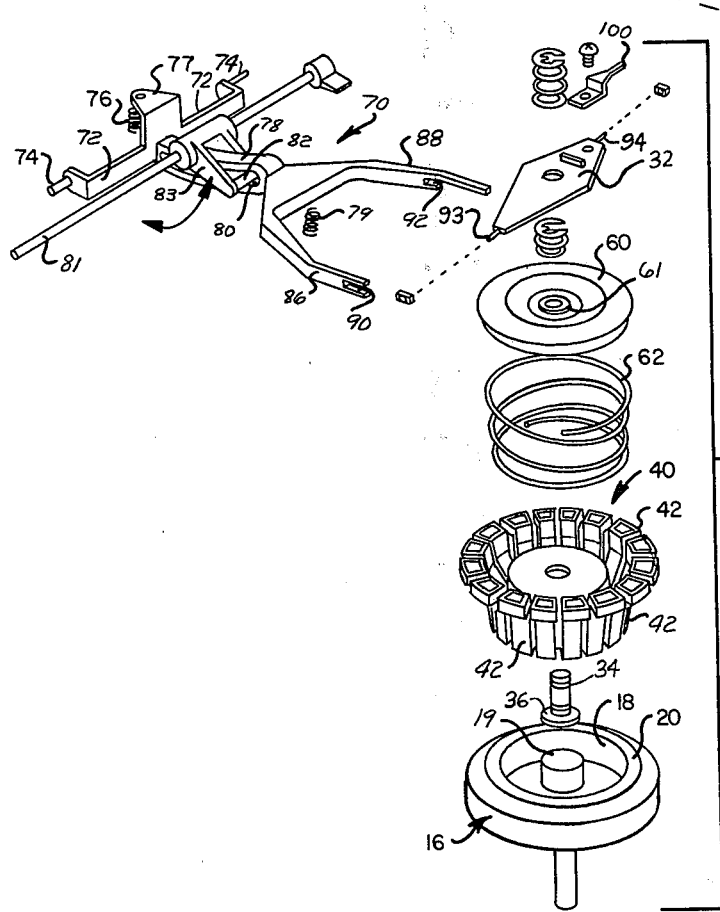
FIG. 2 is an exploded perspective view of the positioner cone assembly utilized in the arrangement of FIG. 1.
Figure 6:
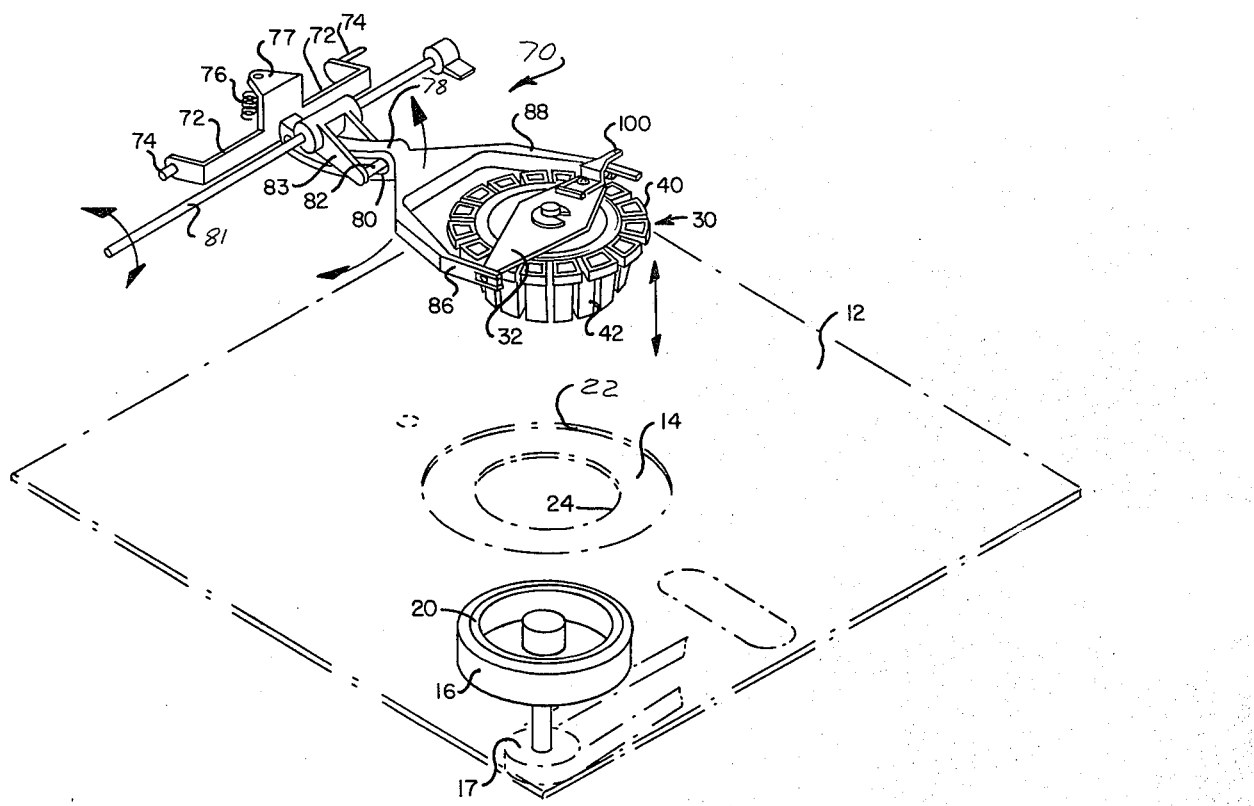
FIG. 6 is a simplified perspective view of the system of FIG. 1, showing the relationship of the elements to a floppy disc.

When the system is to be operated by inserting a floppy disc envelope 12, referring to FIGS. 1, 2 and 6 at the outset, the positioner cone mechanism 30 is held away from the envelope 12 for the floppy disc 14 by the yoke mechanism 70. An adequate spacing above the spindle 16 is available so the envelope 12 may be inserted through the entry slot to a limit position defined by side guides and limit stops (not shown in detail) in conventional fashion. For entry in this fashion, the control pin 82 is moved in the direction toward the central axis of the floppy disc 14 by rotating the control lever 84 at the entry side. After the envelope 12 is inserted the control lever 84 is turned down so that the control pin 82 is rotated backwardly to its opposite limit. This movement urges the positioner cone mechanism 30 downwardly, with the positioner cone 40 entering within the central aperture 24 of the floppy disc 14 in the continuous action previously described. Entry is made directly along the vertical axis because the positioner cone mechanism 30 is guided both byt the gimbal pivots 93, 94 at the ends of the first and second arms 86, 88 and the slide follower 100 engaging the guide groove 102. In the critical region in which the diverging cone petals 42 being to engage the central aperture 24 of the floppy disc 14, the attitude of the cone 40 is kept from tilting relative to the plane of the disc. Further, the cone 40 is kept concentric with the central axis. Irregular entry is thus avoided, and edge damage to the floppy disc 14 and wear of the plastic cone 40 are minimized. A more exact guiding system can be used for some applications, but the groove and follower arrangement shown has proven to be satisfactory in practical floppy disc systems for dual-sided 8' drives.

Figure 3:
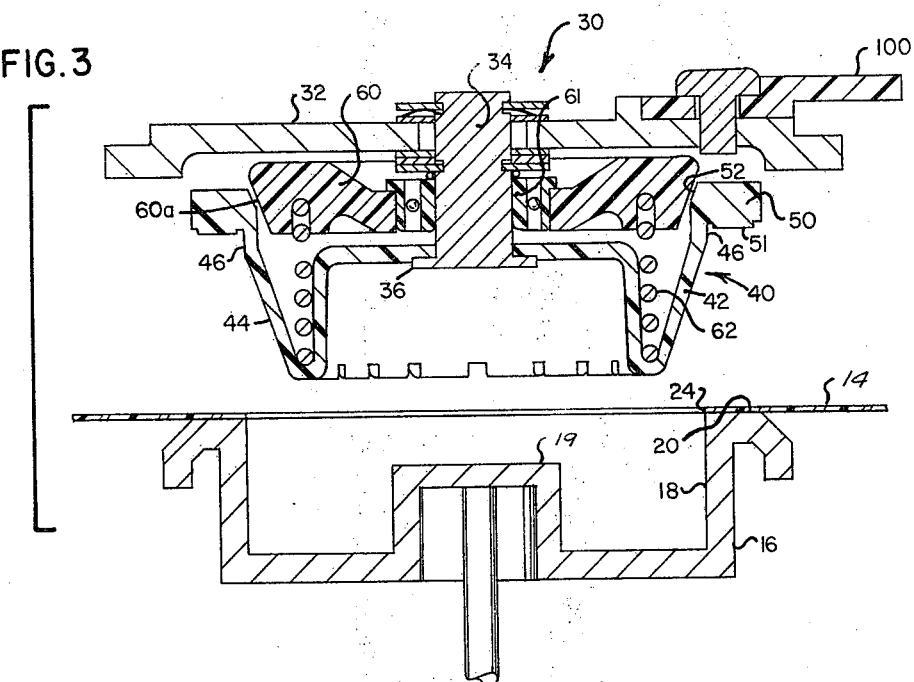
FIGS. 3, 4 and 5 are side sectional views of the positioner cone assembly, showing different positions relative to a floppy disc and a spindle mechanism during centering and clamping operation of the mechanism.
Figure 4:
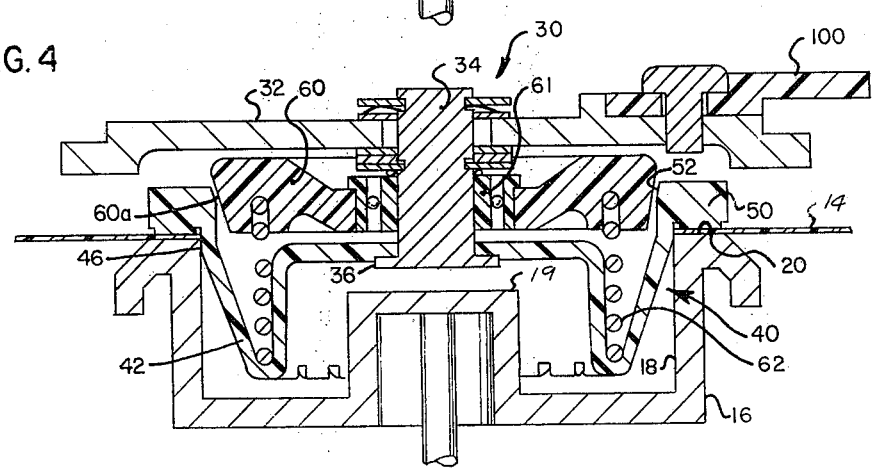
Figure 5:
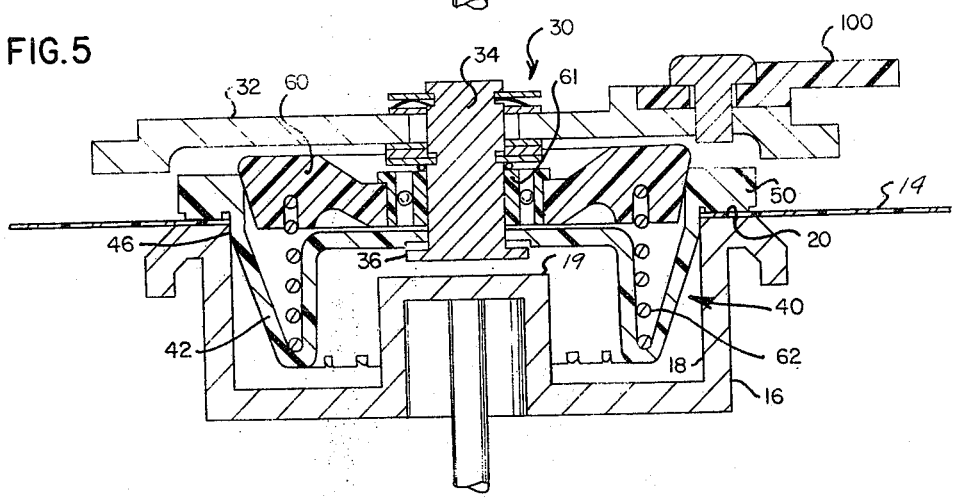

The manner in which the positioner cone mechanism 30 precisely centers and clamps the floppy disc 14 during the entry can be best understood by reference to the step sequence of FIGS. 3 to 5. The taper on the cone 40 is such that the tapered major surfaces 44 on the petals 42 assuredly enter within the central aperture 24 of the floppy disc 14, as long as the envelope 12 is not catastrophically misplaced when inserted. During initial downward movement of the mechanism 30 the follower 60 is held away from the beveled surfaces 52 at the upper inner edge of the positioner cone petals 42 by the helical spring 62. The cone 40 is maintained at its lower limit of movement, against the limit stop 36, as seen in FIG. 3. With further penetration of the cone 40 within the central aperture 24 and within the spindle concavity 18, the diverging tapered surface portions 44 of the petals 42 approach and contact the inner edge of the slightly smaller central aperture 24. The contact at any petal 42 is dependent upon the degree of eccentricity of the disc 14. In response, the petals 42, rather than the floppy disc 14, initially give way as the larger diameter cylinder defined by the petals 42 is compressed within the central aperture 24. However, as the downward movement proceeds and the petal diameters 42 increase, the most displaced petals 42 react against the unclamped disc 14 because of their resiliency, sliding it into concentric position as the bent petals seek to balance. The unclamped disc is of low mass and can readily be moved by these forces which act radially upon it. Concentricity is achieved by the time the vertical minor surfaces 46 near the cone 42 top enter the floppy disc 14, as seen in FIG. 4. The lower portion of the cone 40 at this point is within the spindle concavity 18, and compressed sufficiently by the disc 14 to enter without friction. As downward movement continues slightly further, the undersides 51 of the flanges 50 on the petals 42 contact the annular rim surface 20 of the center spindle 16. At this time, the cone 40 has reached a limit, and the follower 60 moves downwardly relative to the cone 40 and the bevel surfaces 52, against the helical spring 62. A short further movement downward of the follower 60 engages its tapered surface 60a against the surfaces 52 of the positioner cone 40, as shown in FIG. 5. The action concurrently clamps the undersurfaces 51 of the outward flanges 50 against the now positioned floppy disc 14, and against the upper annular rim surface 20 of the center spindle 16, while the cylindrical surface 46 is urged outwardly toward the inner wall of the spindle concavity 18. At the fully locked position of FIG. 5, the cone 40 is free of frictional engagement with the limit stop 36, which has moved a small distance downwardly along the central axis.

Engagement of the follower 60 against the petals 42 at the upper inside surfaces 52 has additional benefits because no distorting vertical or horizontal moments are induced in the petals 42. First, it should be noted that the petals 42 bend inwardly principally at the region of the thin webs 48, although the material is sufficiently light to be compliant in other regions as well. When the follower 60 exerts highest force against the petals 42, as seen in FIG. 7, there is minimal distortion because of the geometry used. The horizontal force vectors H act outwardly and the vertical force vectors V act downwardly around the secured and constrained outer flange 50 of the core 40. Because these forces are centered on the bevel surfaces 52, there can be no imbalance or distortion of the cone.

This system provides reliable positioning and clamping of floppy discs in precise fashion without sensitivity to dimensional variations in the disc aperture. Cone wear, aging, and distortion are minimized, and high clamping forces are assured without any danger of disc damage. Much higher manufacturing yields are possible because the positioner cone dimensions are not as critical as in prior art systems. Using electronic measurement techniques for ascertaining track placement, it has been found that the discs are more accurately and repeatably placed, affording substantial potential for even higher track densities.

While various forms and variations have been described above, it should be appreciated that the invention is not limited thereto but encompasses all modifications and expedients falling within the scope of the appended claims.

What is claimed is:

1. A positioner system for floppy disc drives having a rotatable center spindle comprising:
    a positioner element comprising a multiple-petal cone insertable within the central aperture of a floppy disc, a portion of the outer cone surface defined by the petals being greater in diameter than the nominal dimension of the interior aperture of the floppy disc, the petals being sufficiently compliant to be bent inwardly by the floppy disc edge upon insertion without distorting the floppy disc and to thereafter restore the unclamped disc to concentricity; and
    follower means mounted adjacent the positioner element and movable to engage the petals thereof to urge the petals downwardly to clamp the floppy disc against the spindle.

2. The invention as set forth in claim 1 above, wherein the floppy disc drive center spindle includes a center concavity and an outer annular rim, wherein the positioner element petals each includes an outwardly protruding flange engageable with the annular rim element and wherein the follower means is configured to urge the flanges onto the annular rim to clamp the floppy disc after the floppy disc has been centered.

3. The invention as set forth in claim 2 above, wherein the petals each have an arcuate thin web portion at the converging end thereof for providing compliant yielding to initial displacement by the floppy disc edge.

4. The invention as set forth in claim 3 above, wherein the positioner element petals have beveled upper inner edges and the follower means has a conical taper matching the beveled edges and providing an engagement that urges the petals outward and downward.

5. A positioner system for floppy disc drives having a rotatable center spindle including an annular rim and over which is a floppy disc is positioned comprising:
    a positioner element comprising a multiple-petal cone, each petal including an outer surface including a major portion lying along a conical surface about a central axis and converging to an insert end for the positioner element and an adjoining minor portion at the divergent end lying along a cylindrical surface that is nominally greater in diameter than the nominal dimension of the interior of the floppy disc, the petals of the positioner element being sufficiently compliant to be bent inwardly by the floppy disc edge upon initial contact and the oversize element then restoring the disc to concentricity with the central axis; and
    a follower element mounted concentrically relative to the positioner element and within the petals thereof, the follower element being movable along the central axis relative to the positioner element, to urge the petals downwardly after insertion of the positioner to the cylindrical portion of the positioner outer surface, such that the disc, positioner element and follower are thereafter clamped to the spindle.

6. The invention as set forth in claim 5 above, wherein the petals each include an outwardly extending flange for engaging the central spindle, wherein the center spindle includes a concavity defined by an inner wall for receiving the positioner element, and including in addition means coupled to the positioner element and follower element for moving the positioner system toward and away from the center spindle along the central axis.

7. The invention as set forth in claim 6 above, wherein the means for moving the positioner system comprises a central shaft along the central axis having a limit surface for limiting movement on the shaft of the positioner element in the direction toward the spindle end, and further including spring means between the positioner element and follower element for tending to maintain the follower element against the limit surface prior to clamping.

8. The invention as set forth in claim 7 above, wherein the positioner element has an inverted cup-shaped integral center portion and the petals extend outwardly and upwardly therefrom, the petals curving upwardly from the inner sides at thin web regions to provide the major outer surface portion lying along a diverging conical surface in the upward direction and the adjoining minor surface portion lying along a cylindrical surface, and the petals also including an outwardly extending flanger portion having a bottom surface lying in a plane normal to the central axis, the upper inner edge of the flange being beveled.

9. The invention set forth in claim 8 above, wherein the follower element is a conical member having a taper matching the bevel on the petals, and wherein the positioner element is slideable on the central shaft and so spaced from the follower element that downward movement of the means for moving the positioner causes downward pressure of the flanges against the annular rim of the spindle to clamp the floppy disc for rotation, and also outward pressure of the cylindrical surface portion of the positioner element against the inner wall of the spindle concavity.

10. The invention as set forth in claim 9 above, wherein the central spindle includes an upwardly protruding central portion and an outer portion defining the concavity for receiving the bottom portion of the positioner element, whereby the positioner element nests partially within the concavity, the central spindle also including a terminal outwardly extending flange the upper surface of which defines the annular rim for engaging the floppy disc.

* * * * *

UNITED STATES PATENT AND TRADEMARK OFFICE
CERTIFICATE OF CORRECTION

PATENT NO. :     4,409,629

DATED      :     October 11, 1983

INVENTOR(S) :    Norman M. Puls

It is certified that error appears in the above-identified patent and that said Letters Patent are hereby corrected as shown below:

Column 1, after the title and before "Background of the Invention" insert

--<u>Field of the Invention</u>

This invention relates generally to magnetic disc drive systems employing floppy discs and particularly to an apparatus for precisely and reliably centering and clamping the floppy disc.--

Column 2, line 21, after "system" and before "both", "buffers" should read --suffers--; line 39, after "petals" and before "to", "being" should read --begin--. Column 3, line 4, "<u>Detailed</u>" should read --<u>Brief</u>--; line 42, after "boss" and before "within", "9" should read --19--. Column 4, line 14, after "a" and before "cone", "divering" should read --diverging--; line 35, after "as" and before "seen", "but" should read --best--. Column 5, line 32, after "hereafter" insert a period --.--. Column 6, line 40, after "both" and before "the", "byt" should read --by--; line 44, after "42" and before "to", "being" should read --begin--; line 53, after "dual-sided" and before "drives", "8'" should read --8"--.

UNITED STATES PATENT AND TRADEMARK OFFICE
CERTIFICATE OF CORRECTION

PATENT NO. : 4,409,629

DATED : October 11, 1983

INVENTOR(S) : Norman M. Puls

It is certified that error appears in the above-identified patent and that said Letters Patent are hereby corrected as shown below:

Column 8, line 41, after "which" and before "a" strike "is"; line 49, after "interior" and before "of" insert --aperture--. Column 9, line 23, after "extending" and before "portion", "flanger" should read --flange--.

Signed and Sealed this

Twenty-ninth Day of May 1984

[SEAL]

Attest:

GERALD J. MOSSINGHOFF

Attesting Officer

Commissioner of Patents and Trademarks